United States Patent
Yan

(10) Patent No.: US 11,630,249 B2
(45) Date of Patent: Apr. 18, 2023

(54) SENSING DEVICE WITH CONICAL REFLECTOR FOR MAKING TWO-DIMENSIONAL OPTICAL RADAR

(71) Applicant: Jason Yan, New Taipei (TW)

(72) Inventor: Jason Yan, New Taipei (TW)

( * ) Notice: Subject to any disclaimer, the term of this patent is extended or adjusted under 35 U.S.C. 154(b) by 1006 days.

(21) Appl. No.: 16/285,191

(22) Filed: Feb. 25, 2019

(65) Prior Publication Data
US 2020/0209446 A1 Jul. 2, 2020

(30) Foreign Application Priority Data
Jan. 2, 2019 (TW) ................. 108100023

(51) Int. Cl.
*G01C 3/08* (2006.01)
*G02B 5/10* (2006.01)
*G01S 17/89* (2020.01)
*G01S 17/42* (2006.01)
*G01S 7/481* (2006.01)

(52) U.S. Cl.
CPC .............. *G02B 5/10* (2013.01); *G01S 7/4811* (2013.01); *G01S 17/42* (2013.01); *G01S 17/89* (2013.01)

(58) Field of Classification Search
CPC ........ G01S 7/4811; G01S 17/42; G01S 17/89; G01S 17/894; G02B 5/10; G02B 13/06
See application file for complete search history.

(56) References Cited

U.S. PATENT DOCUMENTS

| 2004/0027554 A1* | 2/2004 | Ishinabe | G01S 7/4915 356/5.1 |
| 2008/0316463 A1* | 12/2008 | Okada | G02B 26/0816 356/4.01 |
| 2018/0284286 A1* | 10/2018 | Eichenholz | G01S 17/89 |
| 2020/0150239 A1* | 5/2020 | Ross | G01S 7/4814 |
| 2021/0389424 A1* | 12/2021 | Yeun | G01S 17/89 |

FOREIGN PATENT DOCUMENTS

| CN | 109387846 A | * | 2/2019 | |
| DE | 19907546 C2 | * | 2/2003 | .......... G01S 7/4812 |
| KR | 20180093537 A | * | 8/2018 | |

* cited by examiner

*Primary Examiner* — Samantha K Nickerson
(74) *Attorney, Agent, or Firm* — Chun-Ming Shih; HDLS IPR Services

(57) ABSTRACT

The present invention provides a sensing device with a conical reflector for making a two-dimensional optical radar that mainly diffuses a light source using a diffusing element to form a diffused light, and directs the light source onto a reflection surface of a reflective element, after the diffused light is reflected to a reflector through the reflection surface, the reflector then reflects the diffused light to form a reflected light, and reflects the reflected light onto the reflection surface in order that the reflected light is reflected onto an optical lens through the reflection surface, and finally, the reflected light is directed onto a sensing module through the optical lens, and the reflected light is received through the sensing module; thereby achieving the effects of omnidirectional real-time scanning, one-time detection of 360-degree environmental characteristic points, and accurately and stably providing relative positions between each characteristic point and a robot.

5 Claims, 3 Drawing Sheets

SENSING DEVICE WITH CONICAL REFLECTOR FOR MAKING TWO-DIMENSIONAL OPTICAL RADAR

BACKGROUND OF THE INVENTION

Field of the Invention

The present invention provides a sensing device with a conical reflector for making a two-dimensional optical radar, and more particularly relates to a sensing device that performs omnidirectional scanning by a two-dimensional optical radar.

Description of the Prior Art

Optical radar is an optical remote sensing technique that emits a laser beam (usually a pulse laser) to a target object. Today's optical radar sensing device is typically composed of a laser sensing device with a rotating tripod head and various positioning or orientation systems (POS), including global positioning system (GPS), inertial measurement unit (IMU) and other sensors. The radar sensing device uses two-dimensional (2D) laser scan to access 360-degree horizontal panoramic data, and a vertical field of view of about 40 degrees. The optical radar sensing device uses the reflection time of each laser beam to determine the range distance from a target. Each laser beam reflection can be calculated by using the position and orientation of the optical radar sensing device, the angle of the scanning mirror on the rotating tripod head, and the slant distance from the target, and can be adjusted according to the common reference system. The collection of these reflective data is called "Point Cloud".

However, the conventional optical radar sensing device requires a rotating tripod head to perform 360-degree environmental scanning and access horizontal panoramic data. Since the rotating tripod head needs to be driven by a motor and power supply to actuate rotational scanning, when being driven by the motor, the rotating tripod head may not be able to effectively perform 360-degree environmental scanning due to unstable motor rotating speed or inadequate power because of power supply system failure, so that measured values cannot be output, and errors occur when scanning 360-degree environment at a same location at different times.

Furthermore, when the rotating tripod head is set on a robot, motional components and volume of the robot are increased, thereby increasing the power consumption of the robot; and because the scanning frequency of the rotating tripod head is low (5-6 Hz), the precision of map scan is low.

Thus, an urgent problem in the field to be solved today is to provide one-time 360-degree environmental scanning without errors, and without having to set the rotating tripod head, otherwise the motional components and volume of the robot will be increased.

SUMMARY OF THE INVENTION

In order to solve the problems disclosed above, an object of the present invention is to provide a sensing device with a conical reflector for making a two-dimensional optical radar that diffuses a light source using a diffusing element and directs the light source onto a reflection surface of a reflective element, after the diffused light source is reflected to a reflector through the reflection surface, the reflector then reflects the light source to form a reflected light, and reflects the reflected light onto the reflection surface in order that the reflected light is reflected onto an optical lens through the reflection surface, and finally, the reflected light is directed onto a sensing module through the optical lens, and the reflected light is received through the sensing module; thereby achieving the effects of omnidirectional real-time scanning, one-time detection of 360-degree environmental characteristic points, and accurately and stably providing relative positions between each characteristic point and a robot.

In order to achieve the above object, the present invention provides a sensing device with a conical reflector for making a two-dimensional optical radar, comprising:

a sensing module;

a light source module, the light source module being disposed in a first direction adjacent to the sensing module, and the light source module providing a light source;

a diffusing element, the diffusing element being disposed in the first direction adjacent to the light source module, the diffusing element receiving the light source, and diffusing the light source toward the first direction to form a diffused light;

a reflective element, the reflective element being disposed in the first direction of the diffusing element diffusing the light source, the reflective element being surroundingly disposed with a reflection surface, the reflection surface receiving the diffused light and reflecting the diffused light onto a reflector, when the reflector receiving the diffused light, the reflector reflecting the diffused light to form a reflected light, and reflecting the reflected light onto the reflection surface in order to reflect the reflected light by using the reflection surface; and an optical lens, the optical lens being disposed between the light source module and the reflective element, the optical lens being internally provided with a hollow portion disposed in the first direction of the light source module providing the light source in order that the light source penetrating the hollow portion, and the optical lens receiving the reflected light and directing the reflected light onto the sensing module.

Preferably, the reflection surface reflects the diffused light onto the reflector at a non-parallel angle, and the reflector reflects the reflected light onto a region of the reflection surface different from a region of the reflection surface where the diffused light is projected onto.

Preferably, a diameter of the diffusing element is smaller than a diameter of the optical lens.

The sensing device of the two-dimensional optical radar further comprises a housing, the housing accommodates the sensing module, the light source module, the diffusing element, the reflective element and the optical lens inside, and the housing is disposed with a window for the diffused light to be reflected onto the reflector.

Preferably, the sensing module is a three-dimensional (3D) time-of-flight sensor.

In order to solve the problems of the prior art, another object of the present invention is to provide a sensing device with a conical reflector for making a two-dimensional optical radar that diffuses a light source using a diffusing element and directs the light source onto a reflection surface of a reflective element, after the diffused light source is reflected to a reflector through the reflection surface, the reflector then reflects the light source to form a reflected light, and reflects the reflected light onto the reflection surface in order that the reflected light is reflected onto an optical lens through the reflection surface, and finally, the reflected light is directed onto a sensing module through the optical lens, and the reflected light is received through the sensing module, thereby achieving the effect of omnidirectional real-time scanning.

In order to achieve the above other object, the present invention further provides a sensing device with a conical reflector for making a two-dimensional optical radar, comprising:

a sensing module;

a light source module, the light source module being disposed in a first direction adjacent to the sensing module, and the light source module providing a light source;

a diffusing element, the diffusing element being disposed in the first direction adjacent to the light source module, the diffusing element receiving the light source, and diffusing the light source toward the first direction to form a diffused light;

a reflective element, the reflective element being disposed in the first direction of the diffusing element diffusing the light source, the reflective element being surroundingly disposed with a reflection surface, the reflection surface receiving the diffused light and reflecting the diffused light onto a reflector, when the reflector receiving the diffused light, the reflector reflecting the diffused light to form a reflected light, and reflecting the reflected light onto the reflection surface in order to reflect the reflected light by using the reflection surface; and an optical lens, the optical lens being disposed between the sensing module and the light source module, and the optical lens receiving the reflected light and directing the reflected light onto the sensing module.

Preferably, the reflection surface reflects the diffused light onto the reflector at a non-parallel angle, and the reflector reflects the reflected light onto a region of the reflection surface different from a region of the reflection surface where the diffused light is projected onto.

Preferably, a diameter of the diffusing element is smaller than a diameter of the optical lens.

Preferably, the sensing device of the two-dimensional optical radar further comprises a housing, the housing accommodates the sensing module, the light source module, the diffusing element, the reflective element and the optical lens inside, and the housing is disposed with a window for the diffused light to be reflected onto the reflector.

Preferably, the sensing module is a three-dimensional (3D) time-of-flight sensor.

Thus, through the above-disclosed technical features, the present invention can achieve the effects of omnidirectional real-time scanning, one-time detection of 360-degree environmental characteristic points, and accurately and stably providing relative positions between each characteristic point and a robot.

BRIEF DESCRIPTION OF THE DRAWINGS

The techniques of the present invention would be more understandable from the detailed description given herein below and the accompanying figures are provided for better illustration, and thus description and figures are not limitative for the present invention, and wherein.

DETAILED DESCRIPTION OF THE INVENTION

The specific embodiments are described below to illustrate the implementation of the present invention, but are not intended to limit the scope of the present invention.

Figure 1:
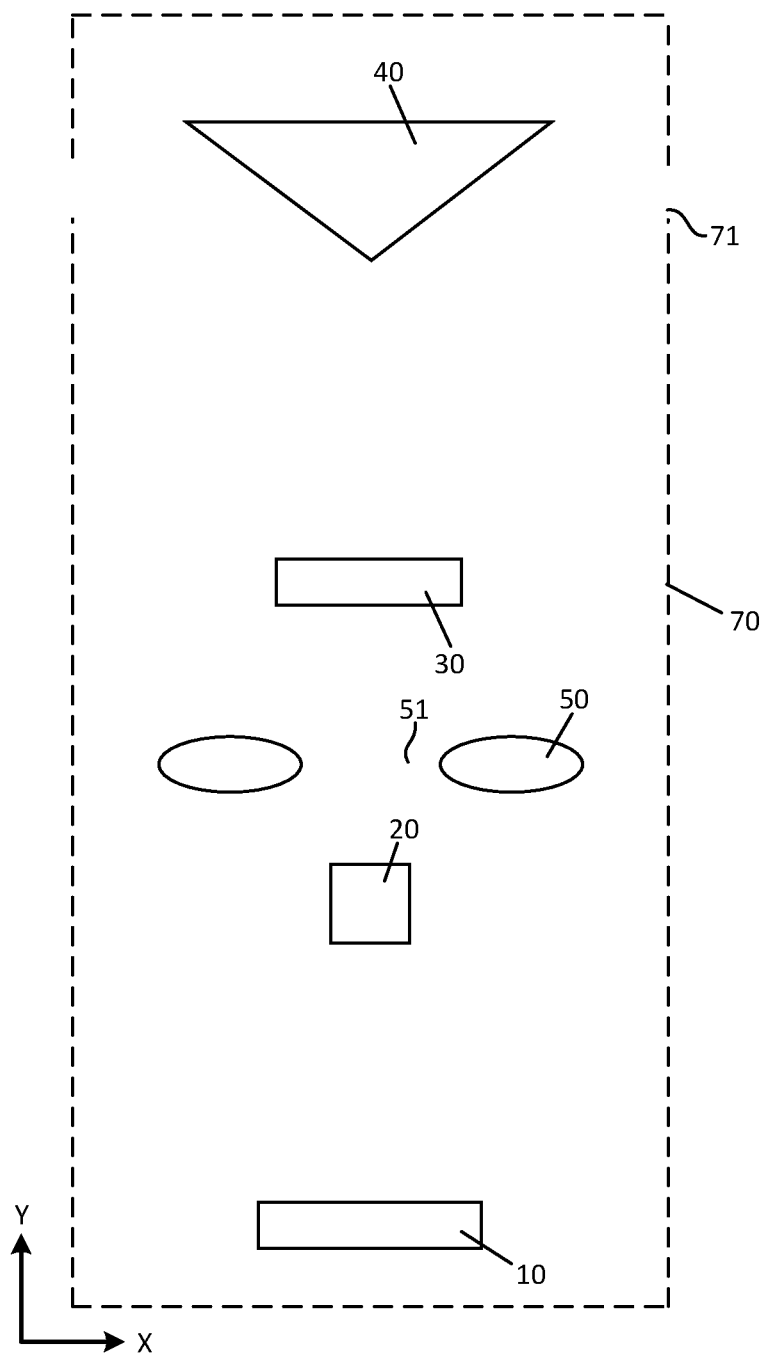
FIG. 1 is a schematic view of the arrangement relationship of internal components of a sensing device of a two-dimensional optical radar of the present invention.
Figure 2:
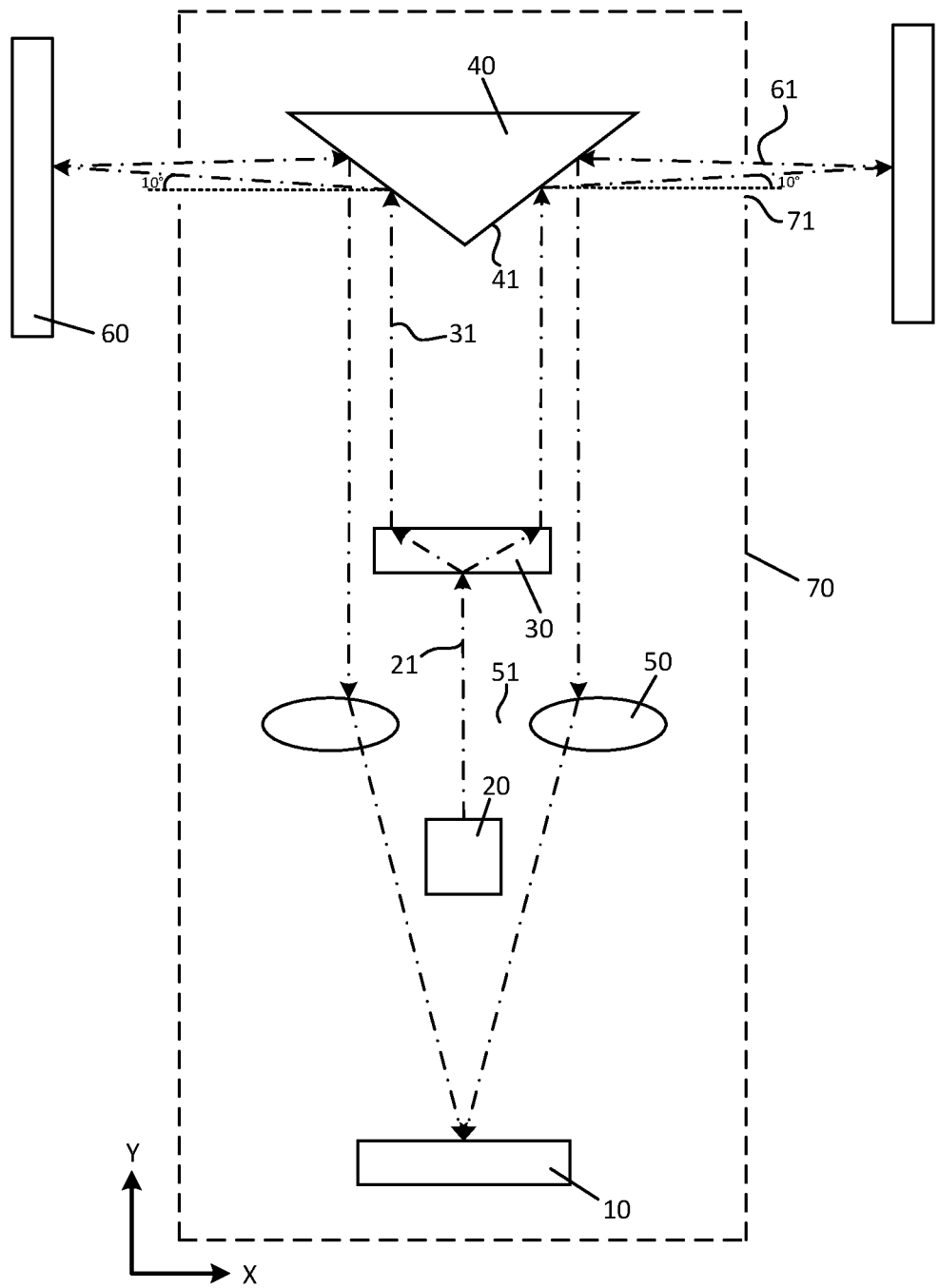
FIG. 2 is a schematic view of the state of use of the internal components of the sensing device of the two-dimensional optical radar of the present invention.

Please refer to FIG. 1 and FIG. 2, which are schematic views showing the arrangement relationship and state of use of the internal components of the sensing device of the two-dimensional optical radar of the present invention. As shown in the figures, the present invention is mainly composed of a sensing module 10, a light source module 20, a diffusing element 30, a reflective element 40 and an optical lens 50, wherein the light source module 20 is disposed in a first direction Y adjacent to the sensing module 10, the diffusing element 30 is disposed in the first direction Y adjacent to the light source module 20, the reflective element 40 is disposed in the first direction Y of the diffusing element 30 diffusing a light source 21, and the optical lens 50 is disposed between the light source module 20 and the reflective element 40. In this embodiment, the optical lens 50 is disposed between the light source module 20 and the diffusing element 30, a hollow portion 51 is disposed inside the optical lens 50 so that the optical lens 50 forms the annular optical lens 50.

The light source module 20 can provide the light source 21, the light source 21 is specifically a laser beam, and the light source module 20 projects the light source 21 to the diffusing element 30 disposed in the first direction Y. When one side of the diffusing element 30 receives the light source 21, the diffusing element 30 diffuses the light source 21 towards the first direction Y from an opposite side of a receiving surface, and the first direction Y is specifically a vertical direction or an approximately vertical direction. Thus, if the light source 21 is vertically projected upward so that a bottom surface of the diffusing element 30 receives the light source 21 in vertical direction, a top surface of the diffusing element 30 outputs the diffused light source 21. Although the diffused light source 21 has a plurality of light beams with different angles to be projected upward, generally, each projection direction of the light source 21 is upward (also as the first direction Y), and is not parallel or approximately parallel. Therefore, after the light source 21 is projected onto the diffusing element 30, it is diffused toward the first direction Y to form a diffused light 31.

When the diffusing element 30 diffuses the diffused light 31 toward the first direction Y, the reflective element 40 receives the diffused light 31 for reflecting externally, and specifically, the reflective element 40 is provided with a reflection surface 41 at a position facing the diffusing element 30, the reflection surface 41 is a sloped surface and is surroundingly disposed on the reflective element 40 so that the reflective element 40 is formed with a shape of conical column. Thus, when the diffused light 31 is projected onto the reflection surface 41, the diffused light 31 is reflected externally in an approximately parallel circular pattern of 360 degrees due to an inclination of the reflection surface 41. When a reflector 60 receives the diffused light 31, the diffused light 31 is reflected back to form a reflected light 61. However, a projected angle of the diffused light 31 is a non-parallel projection angle (for example, a 10 degree angle), when the diffused light 31 is received by the reflector 60, the diffused light 31 is reflected to form the reflected light 61, and the reflected light 61 is reflected onto a region of the reflection surface 41 different from a region of the reflection surface 41 where the diffused light 31 is projected onto.

Thus, when the reflected light 61 is reflected onto the reflection surface 41, because the region of the reflection surface 41 where the reflected light 61 is projected onto is different from the region of the reflection surface 41 where the diffused light 31 is projected onto, the regions of the reflection surface 41 reflecting the reflected light 61 are not the same. When the reflected light 61 is reflected by the reflection surface 41, the reflected light 61 is again projected onto the optical lens 50, so that the reflected light 61 is directed onto the sensing module 10 by the optical lens 50 to perform related measurement operations by the sensing module 10.

The sensing module 10, the light source module 20, the diffusing element 30, the reflective element 40 and the optical lens 50 can be accommodated in a housing 70, wherein the housing 70 is provided with a window 71 for the diffused light 31 to be reflected onto the reflector 60.

Figure 3:
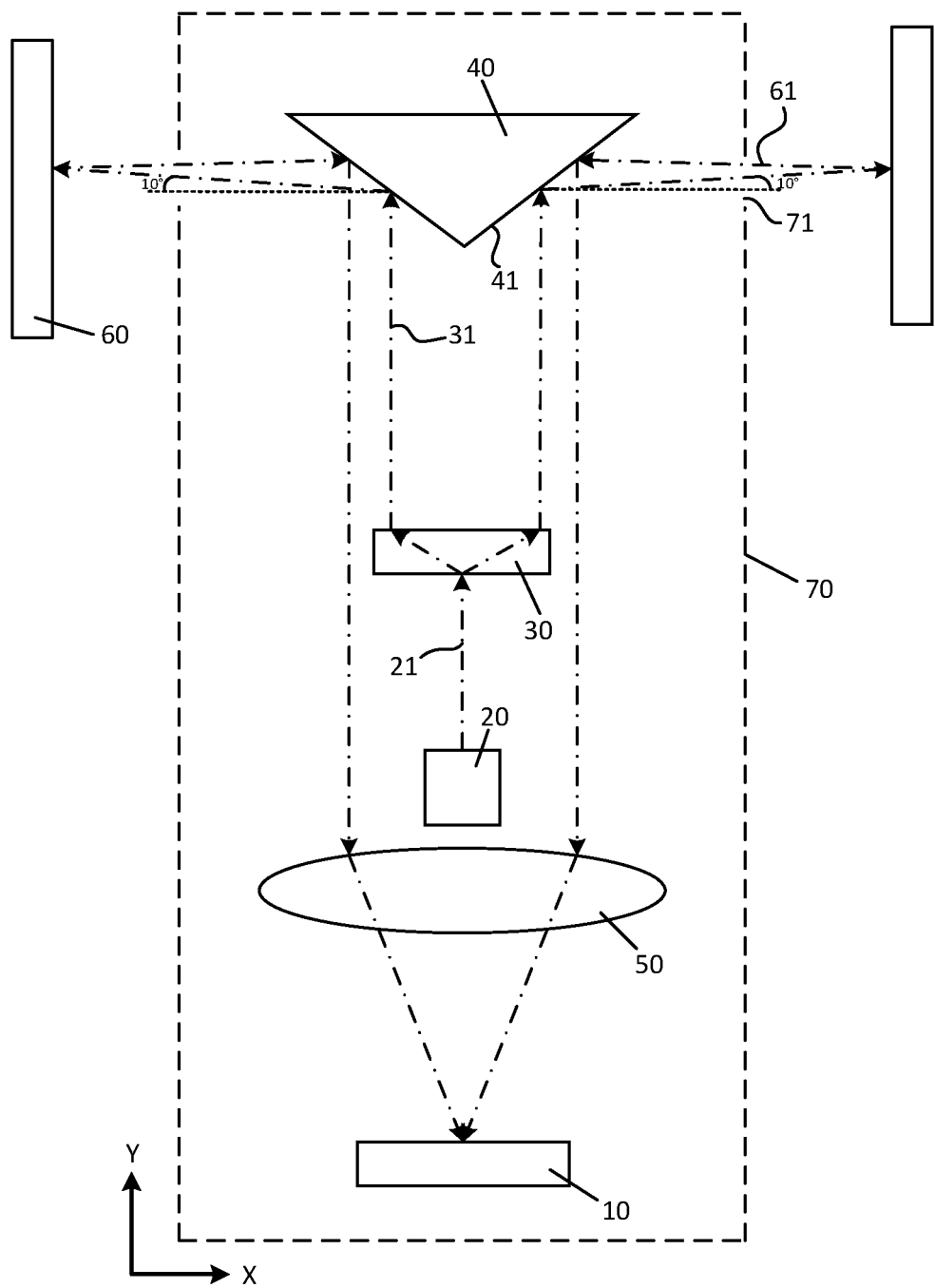
FIG. 3 is a schematic view of the state of use of the internal components of the sensing device of the two-dimensional optical radar according to another embodiment of the present invention.

Please refer to FIG. 3, which is a schematic view of the state of use of the internal components of the sensing device of the two-dimensional optical radar according to another embodiment of the present invention. As shown in the figure, the optical lens 50 can be further disposed between the sensing module 10 and the light source module 20, and the hollow portion 51 is not required to be disposed inside the optical lens 50, the reflected light 61 can still be effectively directed onto the sensing module 10.

By the above-disclosed technical features, the present invention can effectively achieve the following effects:

1. The sensing module 10 can simultaneously acquire images and measure the distance of each of the reflectors 60.

2. Scan rate of up to 150 display frames per second.

3. Real-time scanning in all directions.

4. One-time exposure imaging for accurately and stably providing relative positions between each characteristic point and a robot.

5. Volume of the robot is reduced.

6. Without the noise from the rotating tripod head originally produced during rotary scanning.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A sensing device of a two-dimensional optical radar, comprising:
a sensing module;
a light source module, the light source module being disposed in a first direction adjacent to the sensing module, and the light source module providing a light source;
a diffusing element, the diffusing element being disposed in the first direction adjacent to the light source module, the diffusing element receiving the light source, and diffusing the light source toward the first direction to form a diffused light;
a reflective element, the reflective element being disposed in the first direction of the diffusing element diffusing the light source, the reflective element being surroundingly disposed with a reflection surface, the reflection surface receiving the diffused light and reflecting the diffused light onto a reflector, when the reflector receiving the diffused light, the reflector reflecting the diffused light to form a reflected light, and reflecting the reflected light onto the reflection surface in order to reflect the reflected light by using the reflection surface; and
an optical lens, the optical lens being disposed between the light source module and the diffusing element, the optical lens being internally provided with a hollow portion disposed in the first direction of the light source module providing the light source in order that the light source penetrating the hollow portion, and the optical lens receiving the reflected light and directing the reflected light onto the sensing module;
wherein a light beam from the light source penetrating the hollow portion of the optical lens is directly projected to the diffusing element.

2. The sensing device of the two-dimensional optical radar as claimed in claim 1, wherein the reflection surface reflects the diffused light onto the reflector at a non-parallel angle, and the reflector reflects the reflected light onto a region of the reflection surface different from a region of the reflection surface where the diffused light is projected onto.

3. The sensing device of the two-dimensional optical radar as claimed in claim 1, wherein a diameter of the diffusing element is smaller than a diameter of the optical lens.

4. The sensing device of the two-dimensional optical radar as claimed in claim 1, further comprising a housing, the housing accommodating the sensing module, the light source module, the diffusing element, the reflective element and the optical lens inside, and the housing being disposed with a window for the diffused light to be reflected onto the reflector.

5. The sensing device of the two-dimensional optical radar as claimed in claim 1, wherein the sensing module is a three-dimensional time-of-flight sensor.

* * * * *